(12) United States Patent
Niemczyk

(10) Patent No.: US 10,736,252 B2
(45) Date of Patent: Aug. 11, 2020

(54) DEVICE AND METHOD FOR LOOSENING SOIL

(71) Applicant: Andrew Niemczyk, Hamtramck, MI (US)

(72) Inventor: Andrew Niemczyk, Hamtramck, MI (US)

( * ) Notice: Subject to any disclaimer, the term of this patent is extended or adjusted under 35 U.S.C. 154(b) by 31 days.

(21) Appl. No.: 16/242,339

(22) Filed: Jan. 8, 2019

(65) Prior Publication Data

US 2019/0208694 A1    Jul. 11, 2019

Related U.S. Application Data

(60) Provisional application No. 62/614,531, filed on Jan. 8, 2018.

(51) Int. Cl.
*A01B 45/02* (2006.01)
*A01B 45/00* (2006.01)

(52) U.S. Cl.
CPC .............. *A01B 45/00* (2013.01); *A01B 45/02* (2013.01)

(58) Field of Classification Search
CPC ......... A01B 35/32; A01B 37/00; A01B 39/28; A01B 45/00; A01B 45/02
USPC ..... 47/58.1 SC; 172/21, 682, 766, 771, 776; 405/255, 302.4
See application file for complete search history.

(56) References Cited

U.S. PATENT DOCUMENTS

| | | | | |
|---|---|---|---|---|
| 4,094,363 A * | 6/1978 | McCoomb | ............. | A01B 39/08 172/21 |
| 4,625,473 A * | 12/1986 | Peterson | ................ | G01C 15/04 52/103 |
| 6,691,479 B1 * | 2/2004 | Tscharner | .............. | A01G 17/14 135/118 |
| 6,863,133 B2 * | 3/2005 | Graf | ..................... | A01B 45/026 172/79 |
| 2016/0024739 A1 * | 1/2016 | Kelleher | ............... | E04H 12/223 405/232 |
| 2018/0216306 A1 * | 8/2018 | Gregg | ..................... | E04H 12/22 |
| 2019/0208721 A1 * | 7/2019 | Niemczyk | ................ | A01G 7/06 |

* cited by examiner

*Primary Examiner* — Gary S Hartmann
(74) *Attorney, Agent, or Firm* — John R. Benefiel

(57) ABSTRACT

A device and method for loosening compacted soil, a plurality of tubular devices made from a resiliently compressible material having a hollow hub with a series of radially and circumferentially curving blades extending from the hub, a plurality of devices arranged in an array in soil to cause loosening of the soil as it seasonally expands and contracts and causes compression and subsequent expansion of the devices which in turn loosens the soil sufficiently to aerate the soil.

14 Claims, 3 Drawing Sheets

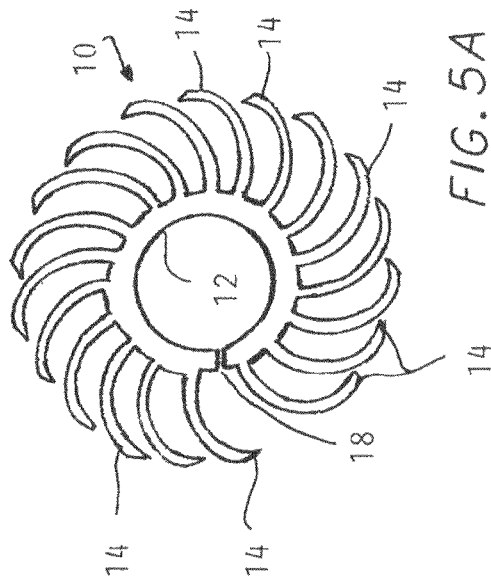
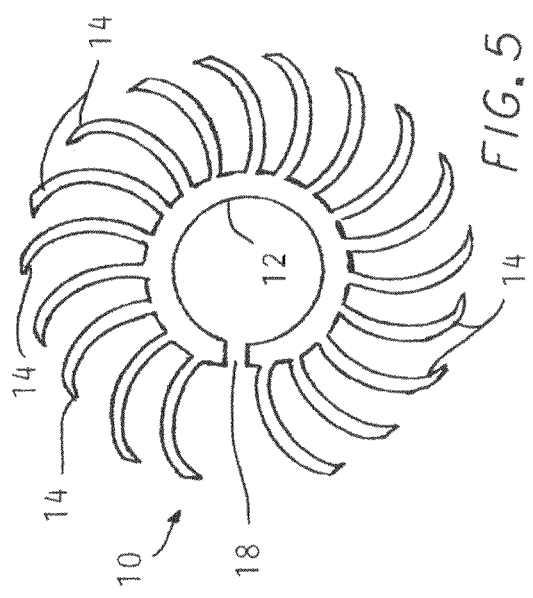
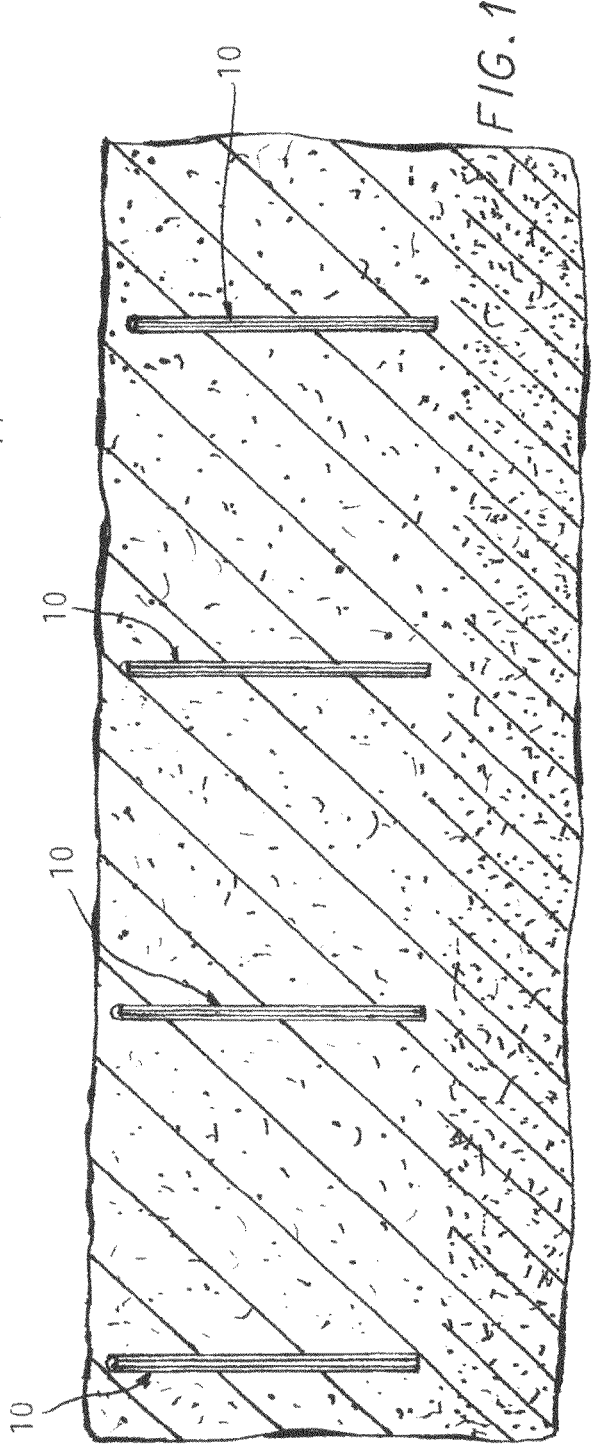

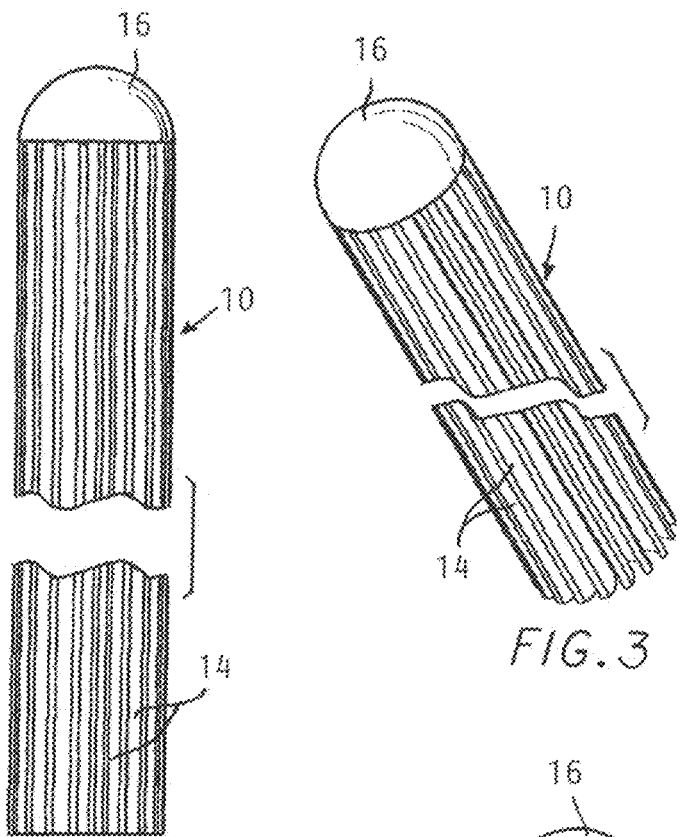
FIG. 3
FIG. 4
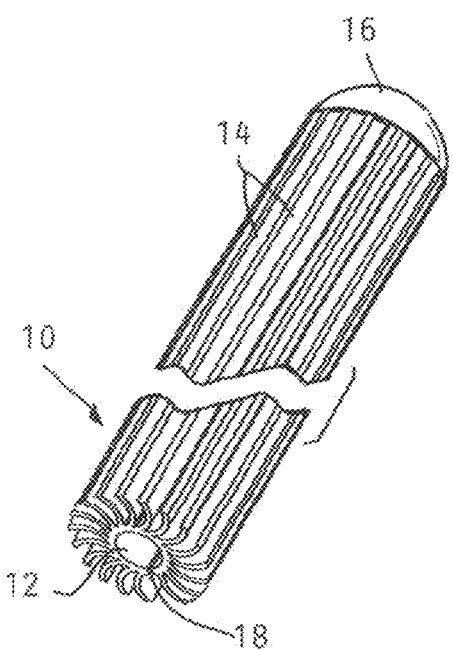
FIG. 3A

DEVICE AND METHOD FOR LOOSENING SOIL

CROSS REFERENCE TO RELATED APPLICATIONS

This application claims the benefit of U.S. provisional patent application No. 62/614,531 filed on Jan. 8, 2018.

BACKGROUND OF THE INVENTION

This invention concerns loosening soil so to allow penetration of air into the soil.

Soil sometimes becomes compacted to the point where air cannot effectively penetrate into the soil to a substantial depth.

It is not practical to work the soil to a substantial depth as with the use of tools or plows in order to loosen up the soil to greater depths. Such working of the soil could also disturb plant roots growing in the soil.

It is an object of the present invention to provide a device and method for loosening soil which does not require the use of soil working implements or plows, and which also does not require substantial labor to carry out.

SUMMARY OF THE INVENTION

The above object and other objects which will be understood by those skilled in the art are accomplished by installing a number of elongated generally tubular devices in the soil, each device installed in a hole drilled or otherwise formed into the ground, with adjacent devices preferably being spaced apart in an array, on the order of 20" inches apart.

The devices may be relatively small in diameter, preferably on the order of ¾".

The devices may be constructed of polyethylene plastic since it is long lasting even when in constant contact with the soil, while remaining resiliently compressible for many years.

Each device has circumferentially spaced apart thin curved blades, all curving in the same circumferential direction and radially projecting out from a hollow tubular hub integral therewith.

Eighteen blades are preferably included in each device as this has been found to enhance the basic ground loosening effect produced by the devices.

A gap in the series of blades is formed by omitting one of the blades and a through radial slot is formed in the hub located within that gap and extending along the length thereof.

The remaining adjacent blades are preferably equally spaced apart.

It has been found that the ground soil naturally expands and contracts over the course of the seasons as by the different moisture contents during the seasons, and this phenomenon is relied on to loosen the soil by the present invention. The seasonal variations in the soil condition cause the blades and hub of the devices to be periodically compressed by the soil, causing the ends of the blades to be deflected radially inwardly and circumferentially towards each other and to re-expand when the soil pressure declines which causes loosening of the soil. The slot in the hub also enables greater inward deflection of the blades with increased pressure of the soil exerted thereon since the hub is able to be radially compressed to a limited extent by the presence of the slot.

Since the devices are resiliently compressed by an increased pressure exerted thereon by the soil, the outer parts of the curved blades expand radially outward and circumferentially away from each other when the soil pressure acting on the device declines due to seasonal changes in the soil condition.

Since the devices are arranged in an array, preferably in a grid pattern forming crossing of the devices in the array, the devices each interact the soil in different directions when reexpanding of the curved blades and hubs of the array of devices occurs in various directions and to create different degrees of soil movement. The net effect of expansion of the adjacent devices in the array is to effectively create a loosening of the soil within the array.

DESCRIPTION OF THE DRAWING FIGURES

FIG. 1 is a sectional view of soil located below the surface of the ground to a substantial depth, and having a plurality of devices according to the invention installed into a respective hole formed in the soil.

FIG. 3 is an enlarged fragmented perspective view from the top of a device according to the present invention.

FIG. 3A is an enlarged fragmented perspective view taken from below of a device according to the invention so as to show the bottom end thereof.

FIG. 4 is an enlarged fragmented side view of a device according to the invention.

FIG. 5 is an enlarged bottom end view of the device shown in FIGS. 3, 3A and 4 in an uncompressed state.

FIG. 5A is an enlarged bottom end view of a device according to the invention in a compressed state.

DETAILED DESCRIPTION

Figure 2:
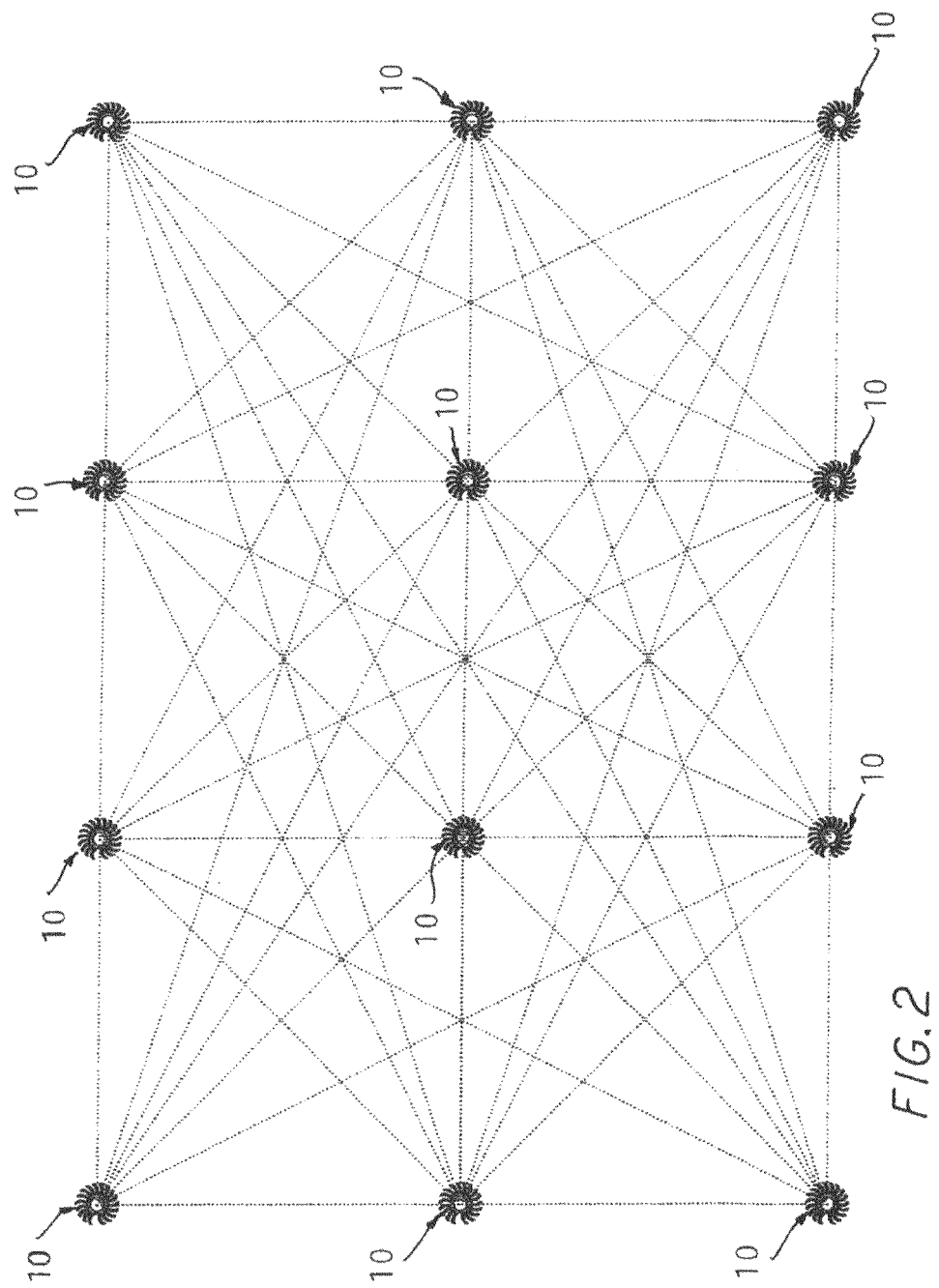
FIG. 2 is a diagrammatic plan view of an array of soil loosening devices according to the invention, with the direction of soil loosening movement of the action produced by the devices in the array represented by broken lines.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings and particularly FIG. 1, a series of elongated generally tubular devices 10 according to the invention is shown, which are each inserted into a respective vertical hole drilled or otherwise formed in the soil.

The soil at the level in which the devices are installed is represented as being in a loosened condition due to the activity of the devices 10 compared to the soil below the level of the bottom of the devices 10 which remains tightly compacted.

The devices 10 may be of a relatively small diameter (i.e., approximately ¾" in diameter) and preferably of a short length, i.e., approximately 17 inches long and may be spaced approximately 20 inches apart in the grid array shown in FIG. 2.

The devices 10 have an inner tubular hub 12 from which radially extend a series of identical curved blades 14. The blades 14 are of a thickness and stiffness which allows them to be resiliently compressed as shown in FIG. 5A, preferably integrally formed with the hub 12 and to act to loosen the soil when the soil compression lessens. A thickness of 0.040 inches and radial length of about 0.420 inches has been successfully used. The blades 14 are curved to progressively extend increasingly circumferentially in the same direction as well as decreasingly less radial at the outer ends thereof. The devices 10 may be made from an extruded durable plastic material such as polyethylene plastic which is resiliently compressible and able to withstand being buried in soil for long periods while still able to expand when the soil pressure decreases sufficiently.

The top end of each device 10 is provided with a cap 16 preferably integrally formed together with the other portions of the devices 10 to close off the top so as to prevent soil packing between the blades 14.

The hub 12 wall is thicker than the blades 14 but has a lengthwise extending radially slot 18 extending completely through the wall of the hub 12 in order to allow radial compaction of the hub 12 to increase the overall resilient compaction of the devices 10.

As noted above, the curved blades 14 extend radially and also circumferentially in the same direction. Preferably there is an equal spacing between successive blades 14 as best seen in FIGS. 5 and 5A except that, a blade 14 is absent at the location of the slot 18.

FIG. 5 depicts a bottom view greatly enlarged of a device 10 in its relaxed condition assumed when the surrounding soil is in a reduced compression state.

FIG. 5A shows a device 10 in a compressed state which occurs when the surrounding soil is in a seasonal compressed state.

The curved blades 14 are thereby compressed in both radial and circumferential directions as shown. The hub 12 is also compressed since the slot 18 allows circumferential movement together of the hub 12 wall on either side of a slot 18 as shown in FIG. 5A.

When the soil pressure decreases, the devices 10 will again expand with the blades 14 moving radially out and retracting circumferentially, the hub 12 also expanding slightly due to the slot 18 as seen in FIG. 5.

This expansion of the blades 14 and hub 12 acts on the surrounding soil to loosen the same sufficiently to allow air to infiltrate into the soil As will be better understood by reference to FIG. 2, the result of the devices 10 being arranged in a grid array creates a varying expansion of the soil in different directions by each device 10. This effect creates a loosening up of the soil which persists during the season when the compression of soil declines enabling atmospheric air to aerate the soil.

The invention claimed is:

1. A ground soil loosening device including an elongated tubular hub having a series of circumferentially spaced apart blades extending all around said tubular hub, each blade in said series having an inner end affixed to said hub and extending along the length of said hub and projecting radially out from a perimeter of said hub, each of said blades having an outer portion continuously curving circumferentially in the same direction towards an outer portion of a next adjacent blade in said series, said blades formed from a resiliently deflectable material so that said outer portion of each of said blades is resiliently deflected radially inwardly by a seasonal increase of ground soil pressure exerted thereon when said device is buried in said ground soil to cause said outer portions of said blades to be moved radially inwardly and to thereafter move back radially out when said ground soil pressure decreases.

2. The ground soil loosening device according to claim 1 wherein said hub has a lengthwise slot extending through a tubular wall of said hub defining said perimeter thereof to allow said tubular wall of said hub to also be resiliently moved radially inwardly by an increase in ground soil pressure.

3. The ground soil loosening device according to claim 1 wherein said resiliently bendable material comprises polyethylene plastic.

4. The ground soil loosening device according to claim 1 wherein a cap is installed closing off said hub and blades of said device at a top end of said device.

5. The ground soil loosening device according to claim 2 wherein said blades are thinner than said wall of said hub.

6. The ground soil loosening device according to claim 1 wherein said devices are approximately 43 cm long.

7. The ground soil loosening device according to claim 1 wherein there are a total of eighteen of said curved blades projecting from said perimeter of said hub.

8. The ground soil loosening device according to claim 1 wherein said outer portions of each blade extends circumferentially past said inner end of a next adjacent blade in said series of blades.

9. A method of loosening compacted ground soil comprising installing a plurality of ground soil loosening devices according to claim 1 into ground soil to be loosened by forming an array of vertically extending holes formed in the ground soil to be loosened and inserting each of said devices in a respective hole and thereafter completely covering an upper end of each device.

10. The method of claim 9 wherein said array is in a grid form with said ground soil loosening devices arranged in rows.

11. The method according to claim 9 wherein said ground soil loosening devices are spaced apart a distance of approximately 51 cm.

12. The method according to claim 9 wherein each of said ground soil loosening devices are about 43 cm long.

13. The method according to claim 9 including providing a total of eighteen of said curved blades in each ground soil loosening device.

14. The method according to claim 9 including capping a top end of each ground soil loosening device.

* * * * *